United States Patent
Kim et al.

(10) Patent No.: US 7,995,026 B2
(45) Date of Patent: Aug. 9, 2011

(54) SENSOR AND DISPLAY DEVICE INCLUDING THE SENSOR

(75) Inventors: Jin-Hong Kim, Yongin-si (KR); Beo-Deul Kang, Seoul (KR); Sung-Jin Hong, Seoul (KR); Kyoung-Ju Shin, Yongin-si (KR); Chong-Chul Chai, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1022 days.

(21) Appl. No.: 11/243,220

(22) Filed: Oct. 4, 2005

(65) Prior Publication Data

US 2006/0077167 A1 Apr. 13, 2006

(30) Foreign Application Priority Data

Oct. 4, 2004 (KR) .................. 10-2004-0078709

(51) Int. Cl.
*G09G 3/36* (2006.01)
(52) U.S. Cl. .................. 345/102; 345/207; 257/414
(58) Field of Classification Search ................ 345/207, 345/87–104; 257/414
See application file for complete search history.

(56) References Cited

U.S. PATENT DOCUMENTS

| | | | | |
|---|---|---|---|---|
| 6,351,283 B1 * | 2/2002 | Liu | | 348/301 |
| 6,542,138 B1 * | 4/2003 | Shannon et al. | | 345/76 |
| 6,975,008 B2 * | 12/2005 | Cok | | 257/414 |
| 7,068,333 B2 * | 6/2006 | Ohashi et al. | | 349/68 |
| 7,595,795 B2 * | 9/2009 | Shin et al. | | 345/207 |
| 2003/0137485 A1 | 7/2003 | Wei et al. | | |

FOREIGN PATENT DOCUMENTS

| | | |
|---|---|---|
| JP | 06011690 A | 1/1994 |
| KR | 2019920008048 Y1 | 10/1992 |
| KR | 1020010007178 A | 1/2001 |

* cited by examiner

*Primary Examiner* — Seokyun Moon
(74) *Attorney, Agent, or Firm* — Cantor Colburn LLP (57) ABSTRACT

A sensor includes a first sensor transistor receiving external light and generating a first sensing current based on an amount of the received external light, a first capacitor storing a first sensing voltage based on the first sensing current from the first sensor transistor, a second sensor transistor receiving external heat and generating a second sensing current based on an amount of the received external heat, a second capacitor storing a second sensing voltage based on the second sensing current from the second sensor transistor, a light blocking member blocking the second sensor transistor from external light, and an opening exposing the first sensor transistor to external light.

21 Claims, 9 Drawing Sheets

SENSOR AND DISPLAY DEVICE INCLUDING THE SENSOR

This application claims priority to Korean Application No. 10-2004-0078709 filed on Oct. 4, 2004 and all the benefits accruing therefrom under 35 U.S.C. §119, the contents of which are herein incorporated by reference.

BACKGROUND OF THE INVENTION (a) Technical Field

The present invention relates to a photosensor and, more particularly, to a display device including a photosensor.

(b) Disclosure of Related Art

Examples of flat panel display devices include liquid crystal display (LCD) devices, organic light emitting diode (OLED) display devices, and plasma display panel (PDP) devices. The LCD devices are the most widely used flat panel display. An LCD device generally includes two panels and a liquid crystal layer having dielectric anisotropy disposed between the two panels. In an LCD device, an electric field is applied to the liquid crystal layer and the electric field is controlled to adjust transmittance of light passing through the liquid crystal layer, thereby displaying images.

Since the LCD device is not a self-emissive display device, it includes a backlight unit for supplying light to the two panels. However, the backlight unit consumes a significant amount of power, and thus it is suggested that a photosensor be employed to control the backlight unit. The photosensor is particularly suited for use in portable devices such as mobile phones and notebook computers.

Photosensors may be integrated into an LCD device for sensing external light to increase light efficiency. The photosensor includes amorphous silicon that may generate leakage current in response to external light. The LCD device senses the leakage current to control itself.

However, it is difficult to exactly sense the amount of external light. Therefore, for example, a transflective LCD device operating in a transmissive mode and a reflective mode may undesirably operate in the transmissive mode under a strong external light to consume significant power for turning on a backlight unit. The transflective LCD device may display a degraded image due to the inconsistency of the external light and the operating mode of the LCD device.

In addition, the temperature of peripheral circumstance may cause the photosensors to fail in sensing the exact amount of the external light. Furthermore, the external light illuminated into a display panel may also affect the operation of the photosensors.

SUMMARY OF THE INVENTION

In an exemplary embodiment of a sensor according to the present invention, the sensor includes a first sensor transistor receiving external light and generating a first sensing current based on an amount of the received external light, a first capacitor storing a first sensing voltage based on the first sensing current from the first sensor transistor, a second sensor transistor receiving external heat and generating a second sensing current based on an amount of the received external heat, a second capacitor storing a second sensing voltage based on the second sensing current from the second sensor transistor, a light blocking member blocking the second sensor transistor from external light and an opening exposing the first sensor transistor to external light.

In another exemplary embodiment, the first sensor transistor includes an input terminal supplied with a first voltage, a control terminal supplied with an off voltage that turns off the first sensor transistor, an output terminal outputting the first sensing current, and a semiconductor layer connected between the input terminal and the output terminal. The second sensor transistor includes an input terminal supplied with the first voltage, a control terminal supplied with the off voltage that turns off the second sensor transistor, an output terminal outputting the second sensing current, and a semiconductor layer connected between the input terminal and the output terminal.

In another exemplary embodiment, the semiconductor layer of the first sensor transistor and the semiconductor layer of the second sensor transistor include the same material. The material of the semiconductor layers includes amorphous silicon.

In another exemplary embodiment, the first capacitor includes a first terminal coupled to the output terminal of the first sensor transistor and a second terminal supplied with a second voltage. The second capacitor includes a first terminal coupled to the output terminal of the second sensor transistor and a second terminal supplied with the second voltage.

In another exemplary embodiment, the sensor further includes a first switching transistor outputting the first sensing voltage in response to a switching signal and a second switching transistor outputting the second sensing voltage in response to the switching signal.

In another exemplary embodiment, the first switching transistor includes a control terminal supplied with the switching signal, an input terminal supplied with the first sensing voltage, and an output terminal outputting the first sensing voltage, and the second switching transistor includes a control terminal supplied with the switching signal, an input terminal supplied with the second sensing voltage, and an output terminal outputting the second sensing voltage.

In another exemplary embodiment, the sensor further includes a third capacitor storing the output voltage of the first switching transistor and a fourth capacitor storing the output voltage of the second switching transistor.

In another exemplary embodiment, the third capacitor includes a first terminal coupled with the output terminal of the first switching transistor and a second terminal supplied with the second voltage, and the fourth capacitor includes a first terminal coupled with the output terminal of the second switching transistor and a second terminal supplied with the second voltage.

In another exemplary embodiment, the sensor further includes a first reset transistor initiating the first sensing voltage in response to a reset signal and a second reset transistor initiating the second sensing voltage in response to the reset signal.

In another exemplary embodiment, the first reset transistor includes a control terminal supplied with the reset signal, an input terminal supplied with the second voltage, and an output terminal outputting the second voltage. The second reset transistor includes a control terminal supplied with the reset signal, an input terminal supplied with the second voltage, and an output terminal outputting the second voltage.

In another exemplary embodiment, an exemplary embodiment of a display device according to the present invention provides a sensor generating a first sensing voltage based on an amount of external light and a second sensing voltage based on an amount of external heat, a sensing signal processor processing the first and the second sensing voltages and generating a control voltage based on the processed first and second sensing voltages, a display panel including pixels, and a controller controlling luminance of the pixels based on the control voltage. The sensor includes a first sensor transistor generating a first sensing current based on an amount of the external light, a first capacitor storing the first sensing voltage based on the first sensing current from the first sensor transistor, a second sensor transistor generating a second sensing current based on an amount of the external heat, a second capacitor storing the second sensing voltage based on the second sensing current from the second sensor transistor, a light blocking member blocking the second sensor transistor from external light and an opening exposing the first sensor transistor to external light.

In another exemplary embodiment, the sensor is disposed near a periphery of the display panel.

In another exemplary embodiment, the first sensor transistor includes a first semiconductor layer generating the first sensing current, the second sensor transistor includes a second semiconductor layer generating the second sensing current, and the first and the second semiconductor layers include amorphous silicon.

In another exemplary embodiment, the sensor further includes a first switching transistor selectively outputting the first sensing voltage in response to a switching signal and a second switching transistor selectively outputting the second sensing voltage in response to the switching signal.

In another exemplary embodiment, the sensor further includes a third capacitor storing the output voltage of the first switching transistor and a fourth capacitor storing the output voltage of the second switching transistor.

In another exemplary embodiment, the sensor further includes a first reset transistor initiating the first sensing voltage in response to a reset signal and a second reset transistor initiating the second sensing voltage in response to the reset signal.

In another exemplary embodiment, the display device may be a liquid crystal display device, an organic light emitting diode display device, a plasma display panel device, or a combination thereof. In particular, the display device may be a transflective liquid crystal display device.

BRIEF DESCRIPTION OF THE DRAWINGS

The present invention will become more apparent by describing embodiments thereof in detail with reference to the accompanying drawings in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention will be described more fully hereinafter with reference to the accompanying drawings, in which embodiments of the invention are shown.

Now, an exemplary embodiment of an LCD including a photosensor according to the present invention will be described in detail with reference to FIGS. 1, 2 and 3.

Figure 1:
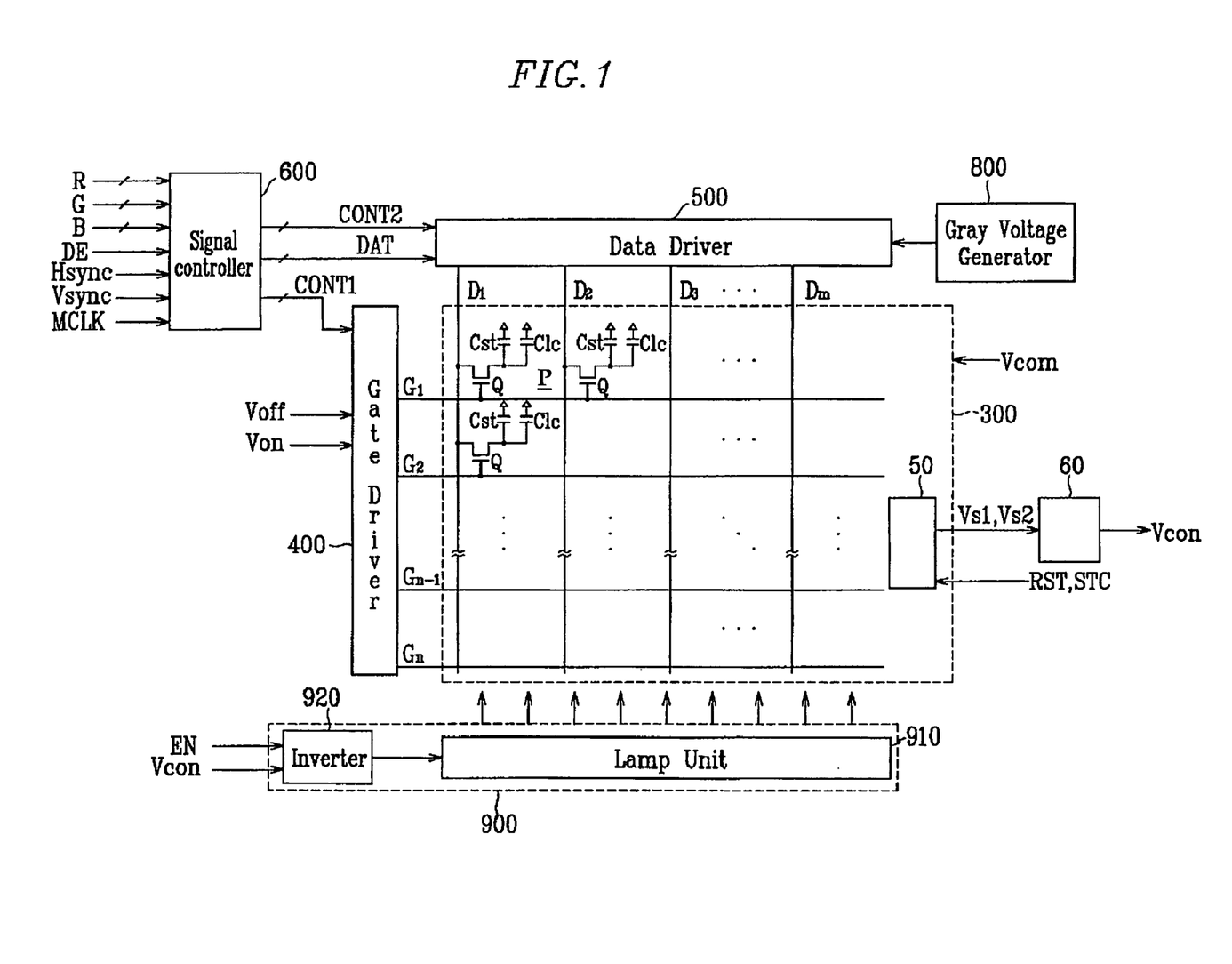
FIG. 1 is a block diagram of an exemplary embodiment of an LCD device according to the present invention.
Figure 2:
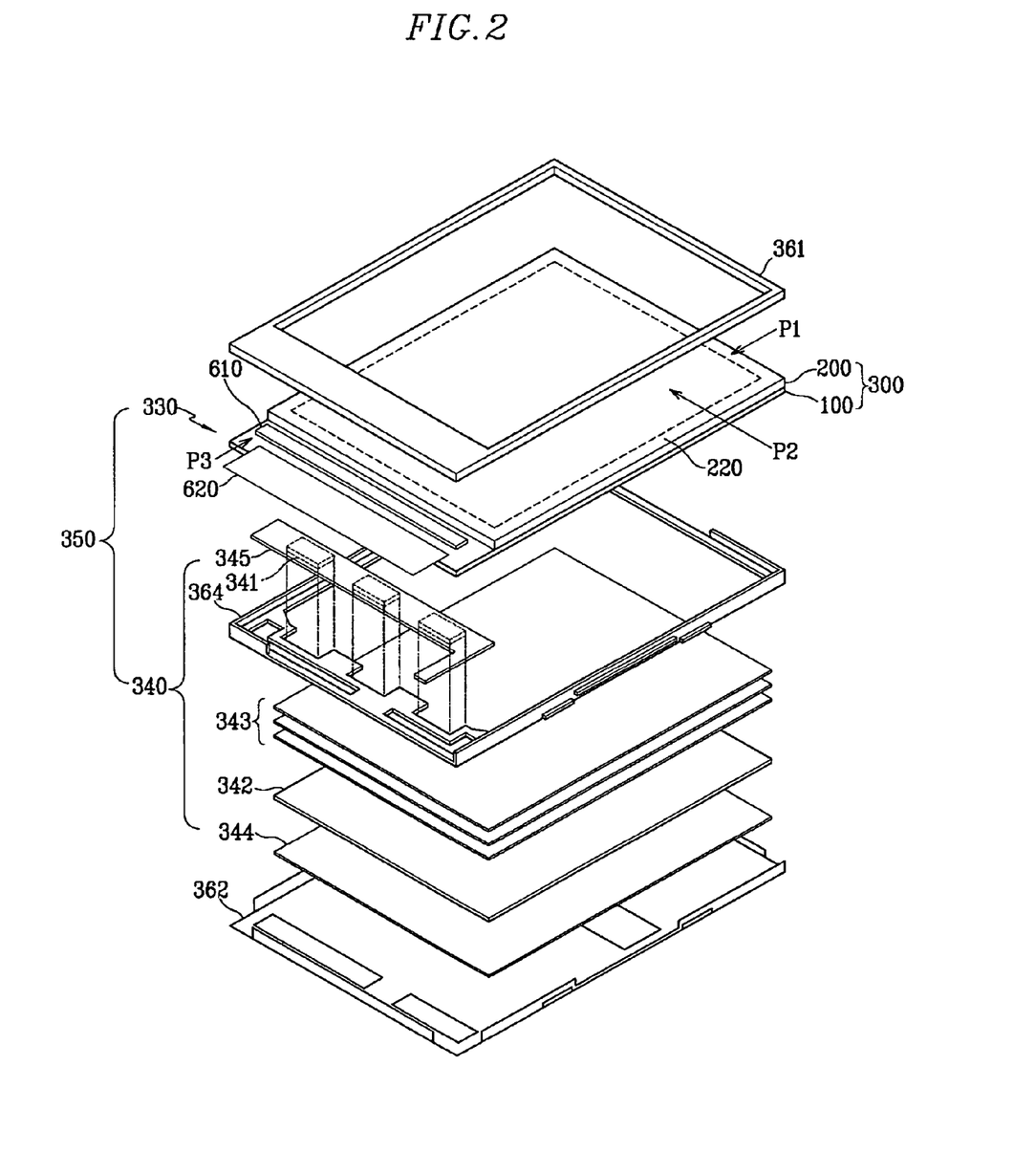
FIG. 2 is an exploded perspective view of an exemplary embodiment of an LCD device according to the present invention.
Figure 3:
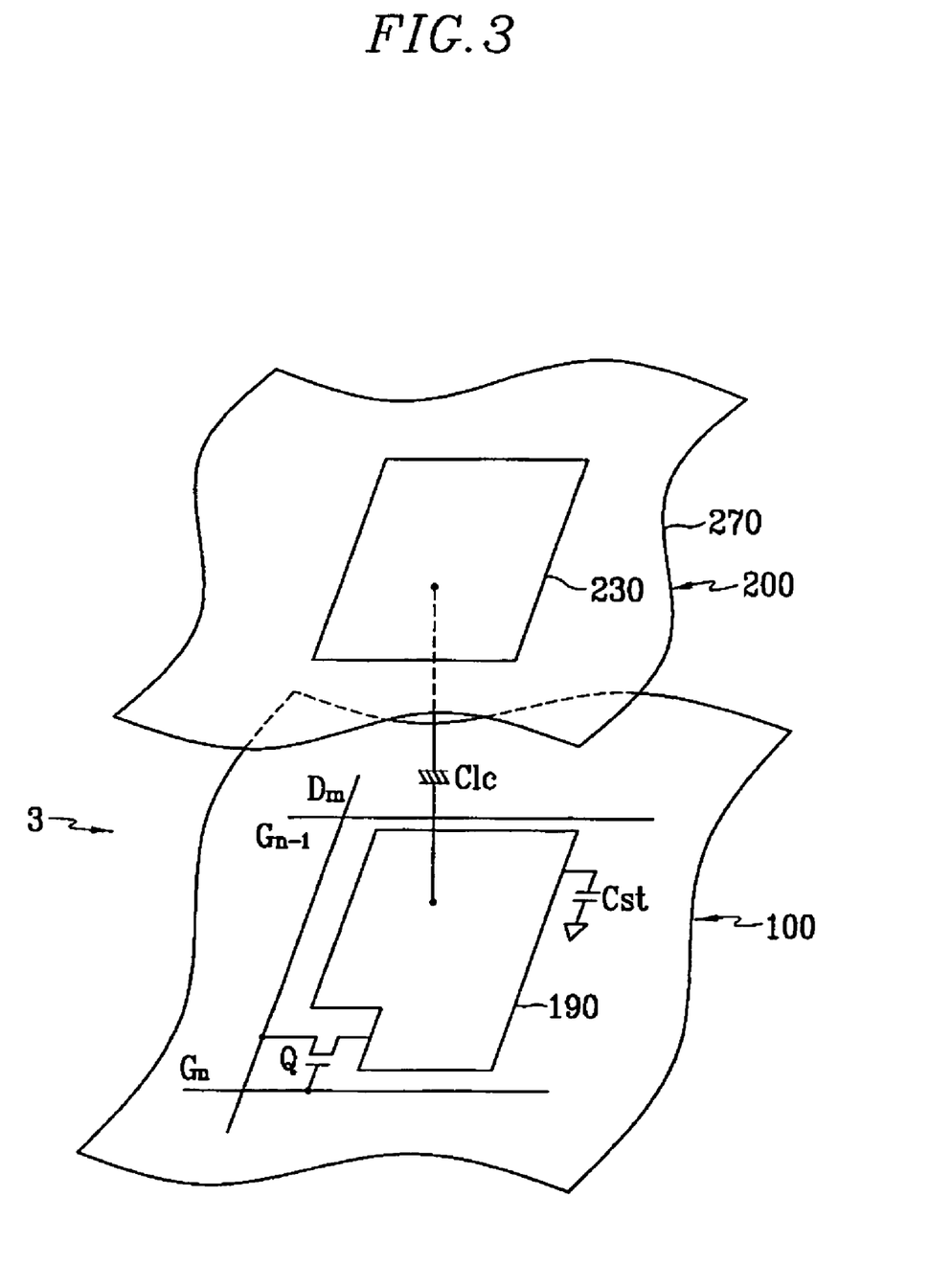
FIG. 3 is an exemplary embodiment of an equivalent circuit diagram of the LCD device shown in FIGS. 1 and 2.

FIG. 1 is an exemplary embodiment of a block diagram of an LCD device according to the present invention, FIG. 2 is an exploded perspective view of an exemplary embodiment of an LCD device according to the present invention, and FIG. 3 is an exemplary embodiment of an equivalent circuit diagram of the LCD device shown in FIGS. 1 and 2.

Referring to FIG. 1, an LCD device includes a display panel assembly 300, a gate driver 400 and a data driver 500 electrically connected to the display panel assembly 300, a gray voltage generator 800 electrically connected to the data driver 500, a lighting unit 900 for illuminating the display panel assembly 300, a photosensor 50 disposed on the display panel assembly 300, a sensing signal processor 60 electrically connected to the photosensor 50, and a signal controller 600 controlling the above-described elements.

The display panel assembly 300 includes a lower panel 100, an upper panel 200, and a liquid crystal (LC) layer 3 interposed therebetween as shown in FIG. 3. The display panel assembly 300 includes a plurality of display signal lines $G_1$-$G_n$ and $D_1$-$D_m$ and a plurality of pixels P electrically connected thereto and arranged substantially in a matrix.

The display signal lines $G_1$-$G_n$ and $D_1$-$D_m$ are disposed on the lower panel 100. Gate lines $G_1$-$G_n$ transmit gate signals (also referred to as "scanning signals") and data lines $D_1$-$D_m$ transmit data signals. In exemplary embodiments, the gate lines $G_1$-$G_n$ extend substantially in a row direction and are substantially parallel to each other, while the data lines $D_1$-$D_m$ extend substantially in a column direction and are substantially parallel to each other. Referring to FIGS. 1 and 3, the gate lines $G_1$-$G_n$ and the data lines $D_1$-$D_m$ may be substantially perpendicular to each other.

In exemplary embodiments, each pixel P includes a switching element Q electrically connected to the display signal lines $G_1$-$G_n$ and $D_1$-$D_m$, and an LC capacitor Clc and a storage capacitor Cst electrically connected to the switching element Q. In alternative embodiments, the storage capacitor Cst may be omitted.

In other exemplary embodiments, the switching element Q may be implemented as a TFT that is disposed on the lower panel 100. Referring to FIGS. 1 and 3, the switching element Q may have three terminals: a control terminal electrically connected to one of the gate lines $G_1$-$G_n$; an input terminal electrically connected to one of the data lines $D_1$-$D_m$; and an output terminal electrically connected to the LC capacitor Clc and the storage capacitor Cst.

The LC capacitor Clc may include a pixel electrode 190 provided on the lower panel 100 and a common electrode 270 provided on an upper panel 200 as two conductors. The LC layer 3 disposed between the pixel and common electrodes 190 and 270 may function as a dielectric of the LC capacitor Clc. The pixel electrode 190 may be electrically connected to the switching element Q, and the common electrode 270 may be supplied with a common voltage Vcom. In exemplary embodiments, the common electrode 270 may cover an entire surface of the upper panel 200. In alternative embodiments, the common electrode 270 may be provided on the lower panel 100, and the pixel and common electrodes 190 and 270 may have shapes of bars or stripes.

In exemplary embodiments, the storage capacitor Cst may be an auxiliary capacitor for the LC capacitor Clc. The storage capacitor Cst includes the pixel electrode 190 and a separate signal line. The separate signal line be provided on the lower panel 100 and may overlap the pixel electrode 190 via an insulator (not shown). The separate signal line may be also supplied with a predetermined voltage such as the common voltage Vcom. In alternative embodiments, the storage capacitor Cst may include the pixel electrode 190 and an adjacent gate line (not shown) called a previous gate line. The previous gate line may overlap the pixel electrode 190 via an insulator.

In exemplary embodiment of a color display, each pixel P may uniquely represent one of primary colors (i.e., spatial division) or each pixel P may sequentially represent the primary colors in turn (i.e., temporal division). A spatial or temporal sum of the primary colors may be recognized as a desired color. An example of a set of the primary colors may include, but is not limited to, red, green, and blue colors. FIG. 3 shows an exemplary embodiment of the spatial division in which each pixel P includes a color filter 230 representing one of the primary colors in an area of the upper panel 200 facing the pixel electrode 190. In alternative embodiments, the color filter 230 may be provided on or under the pixel electrode 190 on the lower panel 100.

In other exemplary embodiments, one or more polarizers (not shown) may be attached to at least one of the lower and upper panels 100 and 200.

Referring to FIGS. 1 and 2, the lighting unit 900 includes a lamp unit 910 and an inverter 920 electrically connected to the lamp unit 910 to provide power to the lamp unit 910. The lamp unit 910 includes light sources 341, a light guiding plate 342, optical sheets 343 and a reflector 344. The inverter 920 may be disposed on a stand-alone inverter PCB (not shown). The light sources 341 may be disposed on a base 345, such as a circuit board.

The gray voltage generator 800 generates two sets of gray voltages related to a transmittance of the pixels. The gray voltages in a first set have a positive polarity with respect to the common voltage Vcom, while the gray voltages in a second set have a negative polarity with respect to the common voltage Vcom.

The gate driver 400 is connected to the gate lines $G_1$-$G_n$ of the display panel assembly 300 and synthesizes the gate-on voltage Von and the gate-off voltage Voff from an external device (not shown) to generate gate signals for application to the gate lines $G_1$-$G_n$.

The data driver 500 is connected to the data lines $D_1$-$D_m$ of the display panel assembly 300 and applies data voltages selected from the gray voltages supplied from the gray voltage generator 800 to the data lines $D_1$-$D_m$.

In another exemplary embodiment of the present invention, IC chips of the gate driver 400 or the data driver 500 may be mounted on the lower panel 100. In alternative embodiments, one or both of the gate and data drivers 400 and 500 may be incorporated along with other elements into the lower panel 100.

The signal controller 600 may control the gate and data drivers 400 and 500, the photosensor 50 and the inverter 920.

Referring again to FIG. 1, the photosensor 50 receives external light and external heat and generates sensor output signals Vs1 and Vs2. Vs1 and Vs2 may have a magnitude corresponding to the amount of external light and external heat, further in response to a reset signal RST and a switching signal SWITCH from the signal controller 600. The sensing signal processor 60 converts the sensor output signals Vs1 and Vs2 from the photosensor 50 into a control signal Vcon for controlling a display mode of the LCD device or changing a gamma value for image signal correction. In alternative embodiments, the display mode may include a transmissive mode and a reflective mode.

The inverter 920 drives the lamp unit 910 in response to a lighting enable signal EN from an external device (not shown) or the signal controller 600, and the control signal Vcon from the sensing signal processor 60.

Referring now to FIG. 2, the LCD device also includes a display module 350 having a display unit 330 and a backlight unit 340, a front chassis 361, a rear chassis 362, and a mold frame 364 containing and fixing the display module 350. The display unit 330 includes a display panel assembly 300, an integration chip 610 and a flexible printed circuit (FPC) film 620. In exemplary embodiments, the FPC film 620 may include signal lines (not shown) transmitting signals and voltages to be supplied to the integration chip 610 and the display panel assembly 300.

The display panel assembly 300 is divided into a display area P2 and a peripheral area P1. The photosensor 50 may be integrated into the display panel assembly 300 and may be disposed in either the display area P2 or the peripheral areas P1.

In exemplary embodiments, the integration chip 610 may be a single chip, also called one-chip, and may include the gray voltage generator 800, the data driver 500, the sensing signal processor 60, and the signal controller 600 shown in FIG. 1. The one-chip may reduce both an area occupied by the above-mentioned elements and a power consumption of the above-mentioned elements.

The backlight unit 340 includes the lamps 341 disposed behind the display panel assembly 300, the light guiding plate 342 and optical sheets 343 that are disposed between the display panel assembly 300 and the lamps 341 to guide and diffuse light from the lamps 341 to the display panel assembly 300. The reflector 344 may be disposed under the lamps 341 and reflect light from the lamps 341 toward the display panel assembly 300.

In another exemplary embodiment, the operation of the LCD shown in FIGS. 1 and 2 will be described in detail.

The signal controller 600 is supplied with input image signals R, G and B and input control signals controlling display of the image signals R, G and B. Input control signals may include, but are not limited to, a vertical synchronization signal Vsync, a horizontal synchronization signal Hsync, a main clock MCLK, and a data enable signal DE from an external graphics controller (not shown). The signal controller 600 generates gate control signals CONT1 and data control signals CONT2 and processes the image signals R, G and B suitable for operation of the display panel assembly 300 in response to the input control signals and the input image signals R, G and B. The signal controller 600 provides the gate control signals CONT1 to the gate driver 400, and the processed image signals DAT and the data control signals CONT2 to the data driver 500.

In exemplary embodiments, the gate control signals CONT1 may include a scanning start signal for initiating scanning and at least one clock signal for controlling the output time of the gate-on voltage Von. The gate control signals CONT1 may further include an output enable signal for defining the duration of the gate-on voltage Von.

In other exemplary embodiments, the data control signals CONT2 may include a horizontal synchronization start signal for informing the data driver 500 of a start of data transmission to pixels, a load signal for instructing the data driver 500 to apply the data voltages to the data lines $D_1$-$D_m$, and a data clock signal. The data control signal CONT2 may further include an inversion signal for reversing a polarity of the data voltages (with respect to the common voltage Vcom).

Responsive to the data control signals CONT2 from the signal controller 600, the data driver 500 receives a packet of the image data DAT for a group of pixels from the signal controller 600. The data driver 500 converts the image data DAT into analog data voltages selected from the gray voltages supplied from the gray voltage generator 800 and applies the data voltages to the data lines $D_1$-$D_m$.

The gate driver 400 applies the gate-on voltage Von to the gate line $G_1$-$G_n$ in response to the gate control signals CONT1 from the signal controller 600, thereby turning on the switching elements Q connected thereto. The data voltages applied to the data lines $D_1$-$D_m$ are supplied to the pixels through the activated switching elements Q.

The difference between a data voltage and the common voltage Vcom applied to a pixel may be expressed as a charged voltage of the LC capacitor Clc, i.e., a pixel voltage. Liquid crystal molecules have orientations depending on a magnitude of the pixel voltage.

By repeating this procedure by a unit of the horizontal period (which is denoted by "1H" and equal to one period of the horizontal synchronization signal Hsync and the data enable signal DE), all gate lines $G_1$-$G_n$ are sequentially supplied with the gate-on voltage Von during a frame, thereby applying the data voltages to all pixels. When a next frame starts after finishing one frame, the inversion control signal applied to the data driver 500 may be controlled such that a polarity of the data voltages is reversed (which is referred to as "frame inversion"). In exemplary embodiments, the inversion control signal may also be controlled such that the polarity of the data voltages flowing in a data line in one frame are reversed (for example, line inversion and dot inversion), or such that the polarity of the data voltages in one packet are reversed (for example, column inversion and dot inversion).

Now, a sensor according to an exemplary embodiment of the present invention will be described in detail with reference to FIG. 4.

Figure 4:
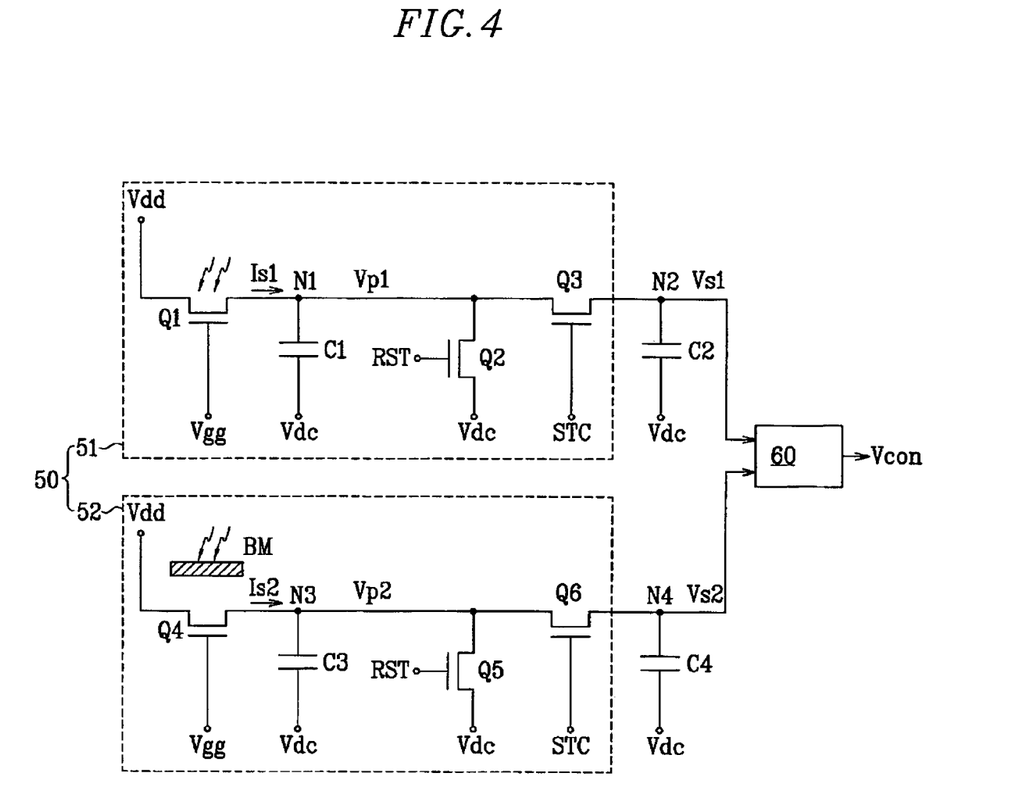
FIG. 4 is an exemplary embodiment of an equivalent circuit diagram of a sensor according to the present invention.

FIG. 4 is an exemplary embodiment of an equivalent circuit diagram of a sensor according to the present invention.

Referring to FIG. 4, a photosensor 50 includes a photo sensing unit 51 and a heat sensing unit 52. The photo sensing unit 51 generates a sensor output signal Vs1 that varies in response to the amount of received external light, while the heat sensor 52 generates a sensor output signal Vs2 that varies in response to the amount of received external heat.

The photo sensing unit 51 includes a sensor transistor Q1, a reset transistor Q2, a switching transistor Q3, and a capacitor C1. The heat sensing unit 52 includes a sensor transistor Q4, a reset transistor Q5, a switching transistor Q6, and a capacitor C3.

Each of the sensor transistors Q1 and Q4 has an input terminal supplied with a first voltage Vdd, a control terminal supplied with a second voltage Vgg, and an output terminal N1 or N3 for outputting sensing currents Is1 or Is2. The sensor transistor Q1 is exposed to external light, while the sensor transistor Q4 is covered with a light blocking member BM to be isolated from external light. Except for the light blocking member BM, the photo sensing unit 51 and the heat sensing unit 52 have equivalent configurations.

In exemplary embodiments, the sensor transistor Q1 may have an amorphous silicon (or polysilicon) layer disposed between the input terminal and the output terminal. The amorphous silicon or polysilicon layer may be exposed to external light such that the sensor transistor Q1 generates a sensing current Is1 having a magnitude depending on incident light the sensor transistor Q1 may also output the sensing current Is1 through the output terminal.

In another exemplary embodiment, the sensor transistor Q4 also may have an amorphous silicon (or polysilicon) layer disposed between the input terminal and the output terminal. However, the amorphous silicon or polysilicon layer may be blocked by the light blocking member BM so that the sensor transistor Q1 may not be affected by external light. Instead, the sensor transistor Q4 in an off state may generate leakage current having a magnitude depending on external heat and outputs the leakage current as the sensing current Is2 through the output terminal.

The capacitor C1, C3 may have one terminal supplied with a third voltage Vdc and the other terminal coupled to the output terminal N1, N3 of the sensor transistor Q1, Q4. The capacitor C1, C3 may store electrical charges according to the sensing current Is1, Is2 from the sensor transistor Q1, Q4, and may generate a voltage Vp1, Vp2 according to the stored electrical charges.

The reset transistor Q2, Q5 may have an input terminal supplied with the third voltage Vdc, a control terminal supplied with a reset signal RST, and an output terminal coupled to the output terminal N1, N3 of the sensor transistor Q1, Q4.

The reset transistor Q2, Q5 turns on and off in response to the reset signal RST. The reset signal RST may be supplied from the signal controller 600 and has a period equal to one or more frames.

In exemplary embodiments, when the reset signal RST becomes sufficiently high enough to turn on the reset transistor Q2, Q5, the electrical charges stored in the capacitor C1, C3 are discharged. Thereafter, when the reset signal RST becomes low enough to turn off the reset transistor Q2, Q5, the capacitor C1, C3 stores electrical charges according to the sensing current Is1, Is2 from the sensor transistor Q1, Q4 to generate the voltage Vp1, Vp2.

The switching transistor Q3, Q6 has an input terminal coupled to the output terminal N1, N3 of the sensor transistor Q1, Q4, a control terminal supplied with a switching signal STC, and an output terminal N2, N4 for outputting the sensor output signal Vs1, Vs2.

The switching transistor Q3, Q6 may turn on and off in response to the switching signal STC. The switching signal STC may also be supplied from the signal controller 600 like the reset signal RST, and may have a period equal to the reset signal RST.

When the switching signal STC becomes sufficiently high enough to turn on the switching transistor Q3, Q6, the voltage Vp1, Vp2 stored in the capacitor C1, C3 is outputted as the sensor output signal Vs1, Vs2 through the output terminal N2, N4. When the switching signal STC becomes low enough to turn off the switching transistor Q3, Q6, the voltage Vp1, Vp2 is blocked.

In exemplary embodiments, the transistors Q1-Q6 may be thin film transistors (TFTs) including, but not limited to, amorphous silicon or polysilicon.

In alternative embodiments, the photosensor 50 may further include capacitors C2 and C4. The capacitor C2, C4 has one terminal supplied with the third voltage Vdc and the other terminal coupled to the output terminal N2, N4 of the switching transistor Q3, Q6.

The capacitor C2, C4 stores the voltage Vp1, Vp2 from the switching transistor Q3, Q6. Accordingly, the sensor output signal Vs1, Vs2 maintains uniform even after the switching transistor Q3, Q6 turns off.

The capacitors C2 and C4 may be provided interior to the integration chip 610 or provided on exposed areas P3 other than the peripheral area P1 of the display panel assembly 300. Advantageously, capacitances of the capacitors C2 and C4 may be increased to reduce sensitivity of the sensor output signal Vs1, Vs2 to noise.

In exemplary embodiments, the first voltage Vdd applied to the sensor transistor Q1 may be a gate on voltage Von for turning on transistors, the second voltage Vgg may be a gate off voltage Voff for turning off transistors and the third voltage Vdc may be a ground voltage. In alternative embodiments, the voltages Vdd and Vgg and Vdc may be different therefrom.

Now, the operation of an exemplary embodiment of an LCD device including a sensor shown in FIGS. 1-4 will be described in detail.

Figure 5:
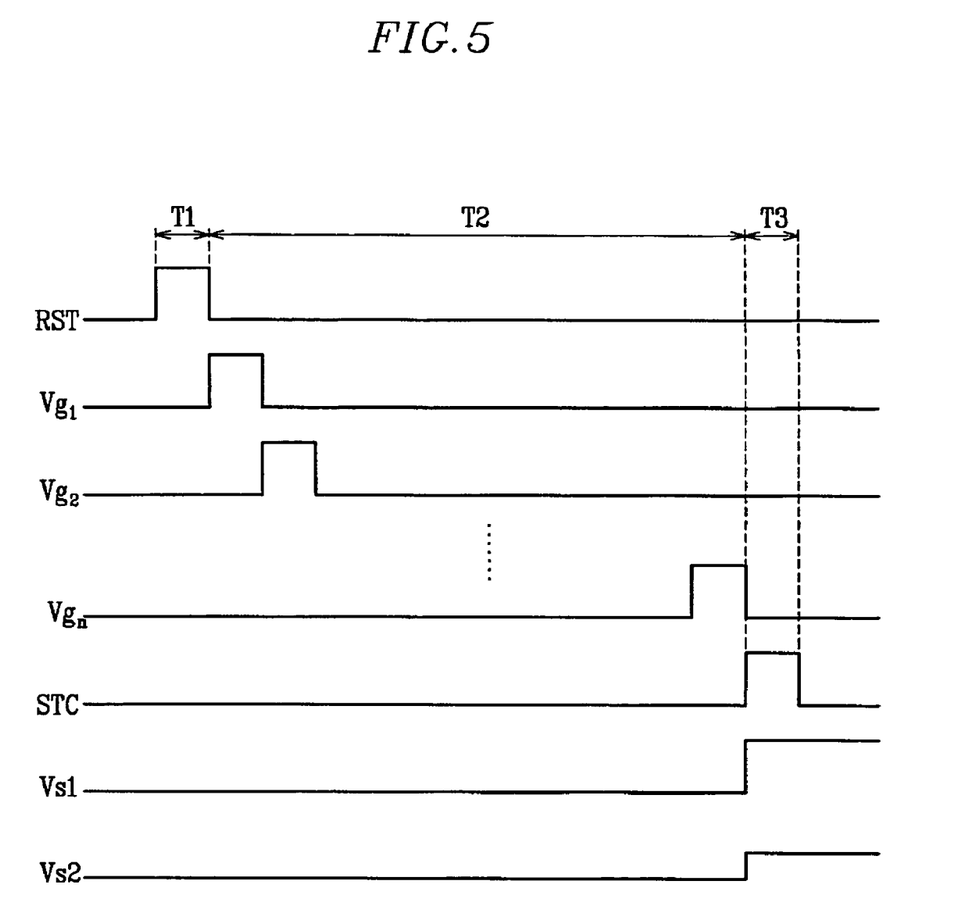
FIG. 5 is an exemplary embodiment of a timing chart of input signals and output signals for the sensor of the LCD device shown in FIGS. 1-4.

FIG. 5 is an exemplary timing chart of input signals and output signals for the sensor of the LCD device shown in FIGS. 1-4.

Referring to FIG. 5, obtaining sensor output signals Vs1 and Vs2 may be repeated by a period of one frame that includes a reset period T1, a charging period T2, and a sampling period T3 according to characteristics of the photosensor 50.

First, the signal controller 600 makes the reset signal RST high, thereby starting the reset period T1. In the reset period T1, the voltages Vp1 and Vp2 stored in the capacitors C1 and C3 in a previous frame are discharged.

Next, the signal controller 600 makes the reset signal RST low to begin the charging period T2. In the charging period T2, the photosensor 50 stores electrical charges according to the sensing currents Is1 and Is2 into the capacitors C1 and C3 to generate the voltages Vp1 and Vp2, respectively. Furthermore, the LCD device applies gate signals $Vg_1$-$Vg_n$ to the gate lines $G_1$-$G_n$ to display image signals.

The sampling period T3 starts when the signal controller 600 make the switching signal STC become high. In the sampling period T3, the sensor output signals Vs1 and Vs2 are stored in the capacitors C2 and C4, respectively, and simultaneously, the sensor output signals Vs1 and Vs2 are read by the sensing signal processor 60.

The sensing signal processor 60 amplifies and processes the sensor output signals Vs1 and Vs2 and processes. For example, the sensing signal processor 60 may convert the amplified sensor output signals Vs1 and Vs2, analog-to-digital, to obtain information on external circumstances depending on external light and external heat. Thereafter, the sensing signal processor 60 performs a control operation according to the obtained information.

In exemplary embodiments, the sensing signal processor 60 may convert the sensor output signals Vs1 and Vs2 into 4-bit digital data. The 4-bit digital data may inform exterior states, such as those shown in TABLE 1, which may be stored in a lookup table.

TABLE 1

| Vs1 | Vs2 | State (luminance, temperature) |
| --- | --- | --- |
| 0000 | 0000 | Normal State (dark, normal) |
| 0011 | 0000 | Light Sensing (dark, normal) |
| 0011 | 0011 | Light and Heat Sensing (dark, normal) |
| . | . | . |
| . | . | . |
| . | . | . |

In exemplary embodiments, the reset signal RST and the switching signal STC may have a period of one frame. The signal controller 600 selects the above-described scanning start signal as the reset signal RST. The signal controller 600 may generate a gate signal as the switching signal STC, which becomes high after a final gate signal $Vg_n$. In alternative embodiments, the signal controller 600 may generate the reset signal RST and the switching signal STC independent of other signals, or select the reset signal RST and the switching signal STC among the gate signals $Vg_1$-$Vg_n$.

In another exemplary embodiment, the reset signal RST and the switching signal STC may have a period of several frames or dozens of frames.

Now, an exemplary embodiment of an LC panel assembly including a sensor according to the present invention will be described with reference to FIGS. 6, 7, 8 and 9.

Figure 6:
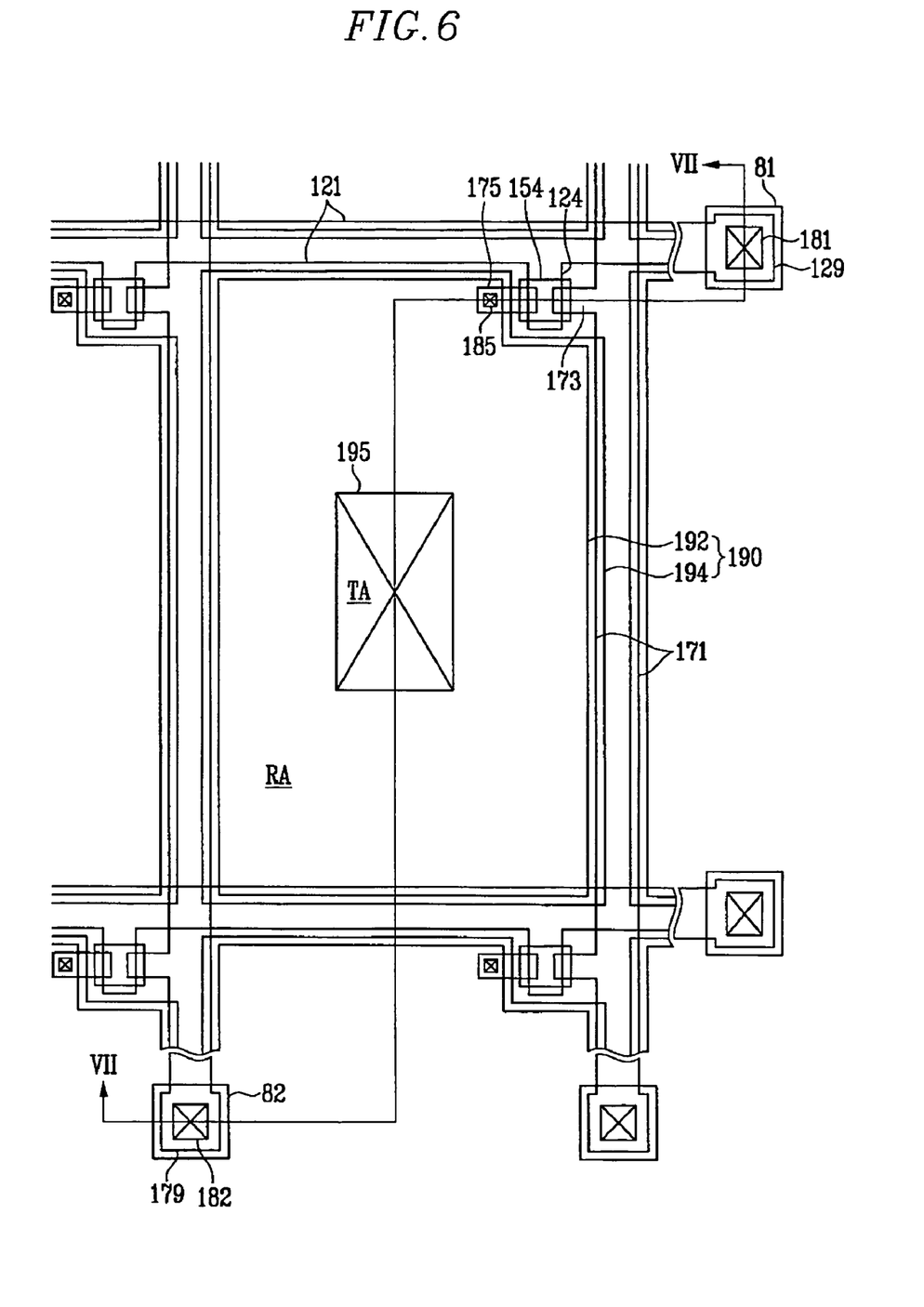
FIG. 6 is a layout view of an exemplary embodiment of an LC panel assembly according to an embodiment of the present invention.
Figure 7:
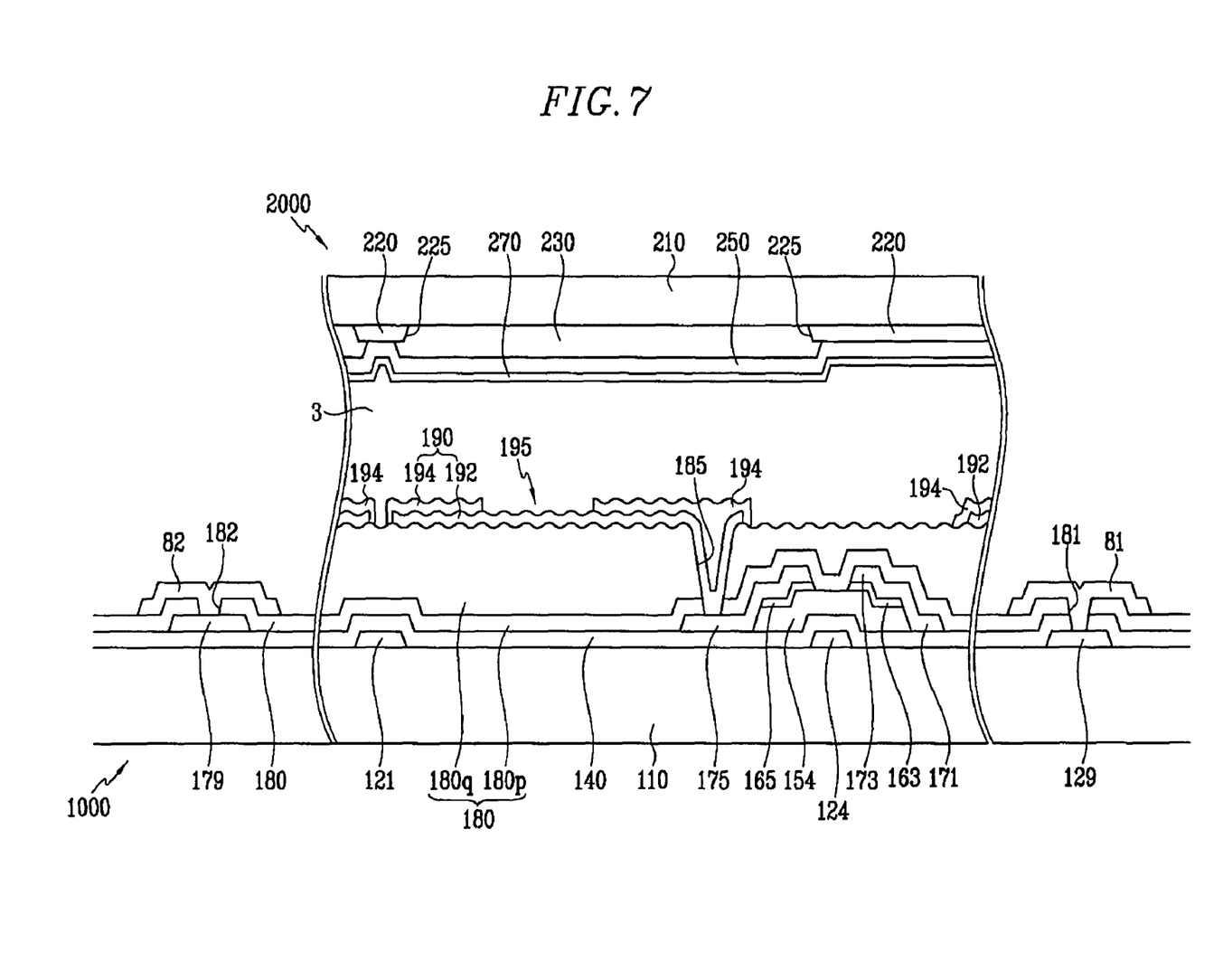
FIG. 7 is a sectional view of the LC panel assembly shown in FIG. 6 taken along line VII-VII.
Figure 8:
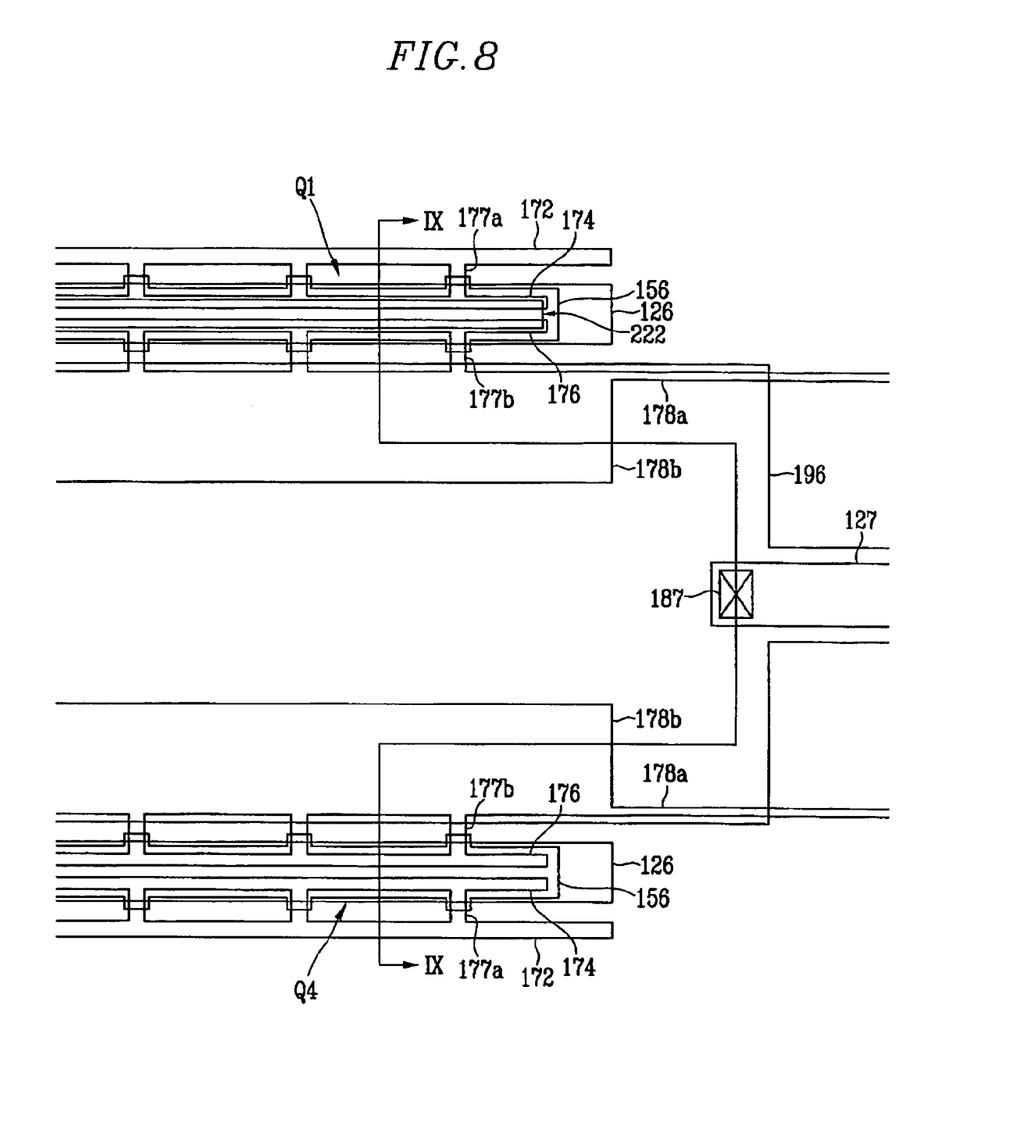
FIG. 8 is a layout view of a sensor transistor shown in FIG. 4.
Figure 9:
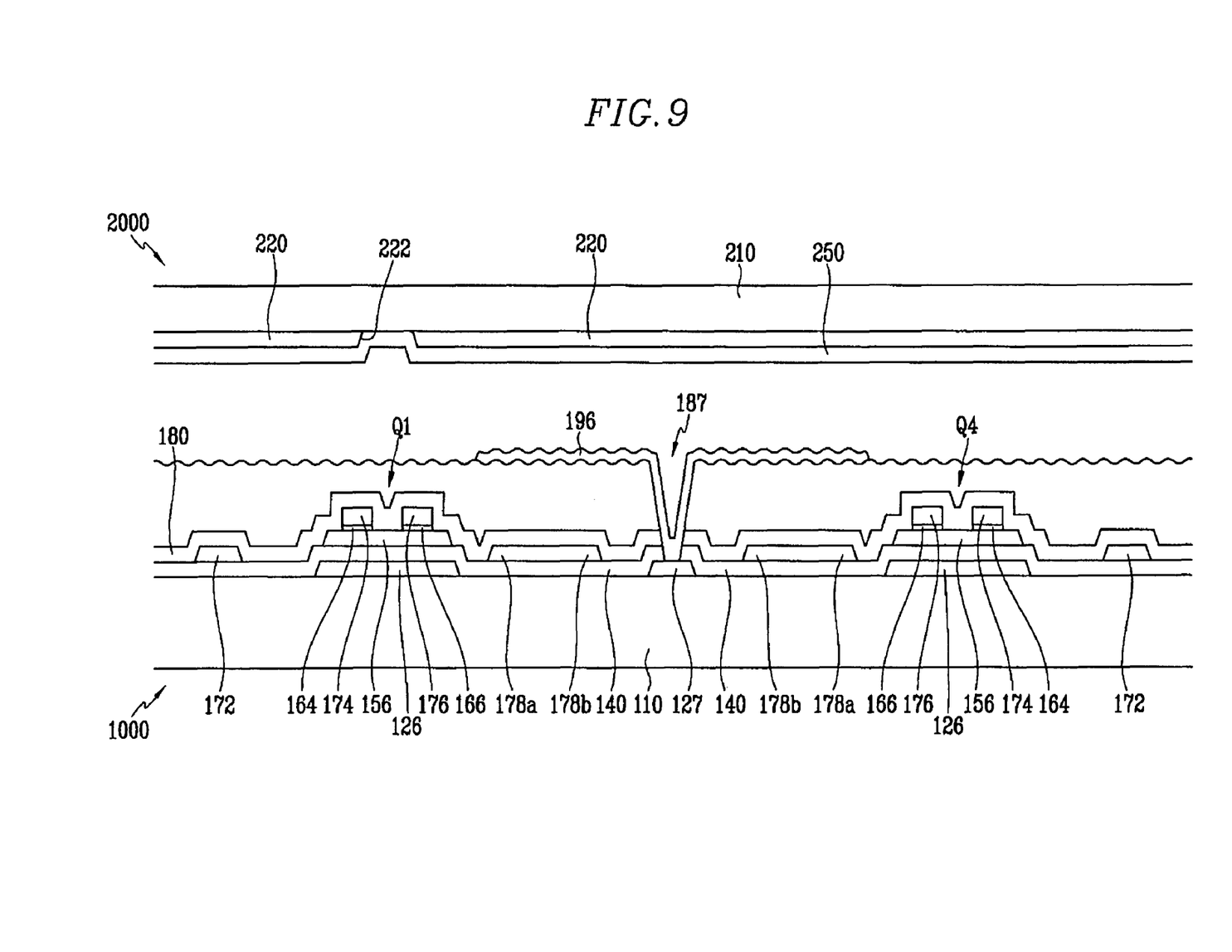
FIG. 9 is a sectional view of the sensor transistor shown in FIG. 8 taken along line IX-IX.

FIG. 6 is a layout view of an exemplary embodiment of an LC panel assembly according to the present invention, FIG. 7 is a sectional view of the LC panel assembly shown in FIG. 6 taken along line VII-VII, FIG. 8 is a layout view of a sensor transistor shown in FIG. 4, and FIG. 9 is a sectional view of the sensor transistor shown in FIG. 8 taken along line IX-IX.

Each of LC panel assemblies according to exemplary embodiments of the present invention includes a TFT array panel 1000, a common electrode panel 2000 facing the TFT array panel, and an LC layer 3 interposed between the panels 1000 and 2000.

An exemplary embodiment of the TFT array panel 1000 will be described in detail.

A plurality of gate conductors including a plurality of gate lines 121, a pair of sensor control electrodes 126, and a sensor voltage line 127 are formed on an insulating substrate 110. The insulating substrate may include, but is not limited to, transparent glass or plastic.

The gate conductors 121, 126 and 127 may extend substantially in a transverse direction and may be separated from each other. The gate lines 121 transmit gate signals, the sensor control electrodes 126 transmit a voltage Vgg, and the sensor voltage line 127 transmits a voltage Vdc. Each of the gate lines 121 may include a plurality of gate electrodes 124 projecting downward and an end portion 129 having a large area for contact with another layer or an external driving circuit.

In exemplary embodiments, the gate conductors 121, 126 and 127 may be made of Al containing metal, including, but not limited to, Al and Al alloy, Ag containing metal, including, but not limited to, Ag and Ag alloy, Cu containing metal, including, but not limited to, Cu and Cu alloy, Mo containing metal, including, but not limited to, Mo and Mo alloy, Cr, Ta, or Ti.

In alternative embodiments, the gate conductors 121, 126 and 127 may have a multi-layered structure including two conductive films (not shown) having different physical characteristics. One of the two films may be made of low resistivity metal including, but not limited to, Al containing metal, Ag containing metal, and Cu containing metal for reducing signal delay or voltage drop. The other film may be made of material such as Mo containing metal, Cr, Ta, or Ti, which has good physical, chemical, and electrical contact characteristics with other materials such as indium tin oxide (ITO) or indium zinc oxide (IZO). Examples of the combination of the two films include, but are not limited to, a lower Cr film and an upper Al (alloy) film, and a lower Al (alloy) film and an upper Mo (alloy) film. In other alternative embodiments, the gate conductors 121, 126 and 127 may be made of various metals or conductors suitable for the purpose described herein.

The lateral sides of the gate conductors 121, 126 and 127 may be inclined relative to a surface of the substrate 110. An inclination angle thereof may range from about 30 to 80 degrees.

In exemplary embodiments, a gate insulating layer 140 may be made of silicon nitride (SiNx) or silicon oxide (SiOx) formed on the gate conductors 121, 126 and 127.

In another exemplary embodiment, a plurality of semiconductor islands 154 and a pair of semiconductor islands 156 may be made of hydrogenated amorphous silicon (abbreviated to "a-Si") or polysilicon. The plurality of semiconductor islands 154 and a pair of semiconductor islands 156 may be formed on the gate insulating layer 140. The semiconductor islands 154 may be disposed on the gate electrodes 124, and the semiconductor islands 156 may be disposed on the sensor control electrodes 126.

A plurality of pairs of ohmic contact islands 163 and 165 may be formed on the semiconductor islands 154, and a plurality of ohmic contact islands 164 and 166 may be formed on the semiconductor islands 156. In exemplary embodiments, the ohmic contacts 163, 164, 165 and 166 may be made of n+ hydrogenated a-Si heavily doped with n type impurity such as phosphorous, or they may be made of silicide.

Referring to FIGS. 7 and 9, the lateral sides of the semiconductor stripes islands 154 and 156 and the ohmic contacts 163-166 may be inclined relative to the surface of the substrate 110. an inclination angle thereof may range from about 30 to-about 80 degrees.

A plurality of data conductors including a plurality of data lines 171, a plurality of drain electrodes 175, a pair of sensor input lines 172, a pair of sensor input electrodes 174, a pair of sensor output electrodes 176, and a pair of sensor output lines 178a are formed on the ohmic contacts 163-166 and the gate insulating layer 140.

The data lines 171 transmit data signals and extend substantially in the longitudinal direction to traverse the gate lines 121. The data lines 171 include a plurality of source electrodes 173 projecting toward the gate electrodes 124 and disposed opposite the drain electrodes 175 with the gate electrodes 124. Each of the data lines 171 includes an end portion 179 having a large area for contact with another layer or an external driving circuit. A gate electrode 124, a source electrode 173, and a drain electrode 175 along with a semiconductor island 154 may form a TFT having a channel formed in the semiconductor island 154 disposed between the source electrode 173 and the drain electrode 175.

The sensor input lines 172, the sensor input electrodes 174, the sensor output electrodes 176, and the sensor output lines 178a may extend substantially in the transverse direction. In exemplary embodiments, each of the sensor input lines 172 may include a plurality of branches 177a connected to the sensor input electrode 174. Each of the sensor output lines 178a may include an expansion 178b and a plurality of branches 177b connected to the sensor output electrode 176. A sensor input line 172, an sensor input electrode 174, and the branches 177a connected therebetween form a ladder shape. A sensor output electrode 176, a sensor output line 178a, and the branches 177b connected therebetween also form a ladder shape. The two ladder shapes may be substantially symmetrical with respect to a sensor control electrode 126. A sensor control electrode 126, a sensor input electrode 174, and a sensor output electrode 176, as well as a semiconductor island 156, may form a sensor transistor Q1, Q4.

In exemplary embodiments, the data conductors 171, 172, 174, 175, 176 and 178a may include, but are not limited to, refractory metal such as Cr, Mo, Ta, Ti, or alloys thereof. In alternative embodiments, the data conductors 171, 172, 174, 175, 176 and 178a may have a multilayered structure including a refractory metal film (not shown) and a low resistivity film (not shown).

Referring to FIGS. 7 and 9, the data conductors 171, 172, 174, 175, 176 and 178a may have inclined edge profiles. An inclination angle thereof may range from about 30 to about 80 degrees.

A passivation layer 180 may be formed on the data conductors 171, 172, 174, 175, 176 and 178a and exposed portions of the semiconductor islands 154 and 156.

In exemplary embodiments, the passivation layer 180 may include a lower passivation film 180p, including, but not limited to, an inorganic insulator such as silicon nitride or silicon oxide and an upper passivation film 180q, including, but not limited to, an organic insulator. In alternative embodiments, the organic insulator may have a dielectric constant less than about 4.0 and it may have photosensitivity. The upper passivation film 180q may have a plurality of openings exposing portions of the lower passivation film 180p and may have unevenness on its surface. The upper passivation layer 180q may be removed in pad areas provided with the end portions 129 of the gate lines 121 and the end portions 179 of the data lines 171 to enhance the adhesion between the end portions 129 and 179 and overlying layers thereon and external devices. The passivation layer 180 may have a single-layer structure including, but not limited to, inorganic or organic insulator.

The passivation layer 180 may have a plurality of contact holes 182 and 185 exposing the end portions 179 of the data lines 171 and portions of the drain electrodes 175, respectively. The passivation layer 180 and the gate insulating layer 140 may have a plurality of contact holes 181 and 187 exposing the end portions 129 of the gate lines 121 and the sensor voltage line 127, respectively. Referring to FIGS. 7 and 9, the contact holes 182 and 185 may have inclined or stepped sidewalls.

A plurality of pixel electrodes 190 and a plurality of sensing electrodes 196 may be formed on the passivation layer 180.

Each of the pixel electrodes 190 may have an unevenness following the unevenness of the upper passivation film 180q. The pixel electrodes 190 may include a transparent electrode 192 and a reflective electrode 194 disposed thereon. In exemplary embodiments, the transparent electrode 192 may be made of transparent conductor, including, but not limited to, ITO or IZO. The reflective electrode 194 may be made of Al, Ag, Cr, or alloys thereof. In alternative embodiments, the reflective electrode 194 may have a dual-layered structure including a low-resistivity, reflective upper film (not shown). The low resistivity, reflective upper film may include, but is not limited to, Al, Ag, or alloys thereof. The reflective electrode 194 may also have a good contact lower film (not shown), including, but not limited to, Mo containing metal, Cr, Ta, or Ti, having good contact characteristics with ITO or IZO.

The reflective electrode 194 may have a transmissive window 195 disposed in an opening of the upper passivation film 180q and exposing the transparent electrode 192. Referring to the exemplary embodiment of FIG. 4, the reflective electrode 194 may have an opening (not shown) disposed on a sensor TFT Q1.

In exemplary embodiments, the pixel electrodes 190 are physically and electrically connected to the drain electrode 175 through the contact hole 185 such that the pixel electrodes 190 receive data voltages from the drain electrode 175. The pixel electrodes 190, supplied with the image data voltages, may generate electric fields in cooperation with a common electrode 270 of the common electrode panel 2000 supplied with a common voltage Vcom. The electric fields may determine the orientations of liquid crystal molecules of the liquid crystal layer 3 disposed between the pixel electrode 190 and the common electrode 270. The pixel electrode 190 and the common electrode 270 form a LC capacitor Clc, which stores applied voltages after the switching TFT Q turns off.

In exemplary embodiments, a pixel P of the display panel assembly 300, that may include the TFT array panel 1000, the common electrode panel 2000 and the LC layer 3, may divided into a transmissive region TA and a reflective region RA. The transmissive region TA and the reflective region RA may be defined by a transparent electrode 192 and a reflective electrode 194, respectively. The transmissive region TA may include portions disposed on and under the transmissive windows 195. The reflective region RA may include portions disposed on and under the reflective electrodes 194.

In the transmissive region TA, light incident from a rear surface of the display panel assembly 300, i.e., from the TFT array panel 1000 passes through the LC layer 3 and goes out of a front surface, i.e., out of the common electrode panel 2000, thereby displaying images. In the reflective regions RA, light incident from the front surface enters into the LC layer 3, is reflected by the reflective electrode 194, passes through the LC layer 3 again, and goes out of the front surface, thereby displaying images.

In exemplary embodiments, each of the pixel electrodes 190 may overlap a gate line 121 adjacent thereto to form a storage capacitor Clc. In alternative embodiments, a plurality of storage electrode lines (not shown) overlapping the pixel electrodes 190 to form storage capacitors Clc may be provided on the TFT array panel 1000.

In another exemplary embodiment, the sensing electrodes 196 may be made of the same layer as the transparent electrodes 192 or the reflective electrodes 194 of the pixel electrodes 190. In alternative embodiments each of the sensing electrodes 196 may also include a transparent electrode (not shown) made of the same layer as the transparent electrodes 192 of the pixel electrodes 190 and a reflective electrode (not shown) made of the same layer as the reflective electrodes 194 of the pixel electrodes 190.

The sensing electrodes 196 may be physically and electrically connected to the sensor voltage line 127 through the contact holes 187 such that the sensing electrodes 196 receive voltages Vdc from the sensor voltage line 127. A sensing electrode 196 and the expansions 178b of the sensor output lines 178a form a capacitor C1, C3.

Contact assistants 81 and 82 may be connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

Referring to FIGS. 7 and 9, a description of an exemplary embodiment of the common electrode panel 2000 follows.

A light blocking member 220, that may be referred to as a black matrix, for preventing light leakage, may be formed on an insulating substrate 210. The insulating substrate 210 may include, but is not limited to, transparent glass or plastic. The light blocking member 220 may have a plurality of openings 225 facing the pixel electrodes 190 and an opening 222 facing the semiconductor island 156 of the sensor transistor Q1.

A plurality of color filters 230 may also be formed on the substrate 210. The color filters 230 may be disposed substantially in the openings 225 of the light blocking member 220. In exemplary embodiments, the color filters 230 may extend substantially in the longitudinal direction along the pixel electrodes 190. In alternative embodiments, the color filters 230 may represent one of the primary colors such as red, green and blue colors.

An overcoat 250 may be formed on the color filters 230 and the light blocking member 220. The overcoat 250 may include, but is not limited to, an (organic) insulator. The overcoat 250 may prevent the color filters 230 from being exposed and provide a flat surface. In alternative embodiments, the overcoat 250 may be omitted.

A common electrode 270 that may be made of transparent conductive material such as ITO and IZO, may be formed on the overcoat 250.

The above-described exemplary embodiments, including a sensor, may be applied to any kind of display device, including, but not limited to, an organic light emitting diode display, a plasma display panel, or the like, for controlling the luminance of pixels.

The sensor including a sensor transistor receiving external light and another sensor transistor blocked from external light, can sense external light and external heat to generate sensing signals. Advantageously, the display device including the sensor may control the backlight unit to obtain efficient light characteristics and to reduce power consumption.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A sensor comprising:
   a first sensor transistor receiving external light and generating a first sensing current based on an amount of the received external light;
   a first capacitor storing a first sensing voltage based on the first sensing current from the first sensor transistor;
   a second sensor transistor blocked from the external light and receiving external heat and generating a second sensing current based on an amount of the received external heat;
   a second capacitor storing a second sensing voltage based on the second sensing current from the second sensor transistor; and
   a light blocking member blocking the second sensor transistor from the external light and including an opening which penetrates through an extending surface of the light blocking member and exposes the first sensor transistor to the external light,
   wherein
   both the first sensor transistor and the second sensor transistor are disposed on a same side with respect to the light blocking member, so that the external light and the external heat are received from a same direction.

2. The sensor of claim 1, wherein the opening is formed at a selected portion of the light blocking member.

3. The sensor of claim 1, wherein the first sensor transistor comprises
   an input terminal supplied with a first voltage, a control terminal supplied with an off voltage that turns off the first sensor transistor, an output terminal outputting the first sensing current, and a semiconductor layer connected between the input terminal and the output terminal, and
   wherein the second sensor transistor comprises an input terminal supplied with the first voltage, a control terminal supplied with the off voltage that turns off the second sensor transistor, an output terminal outputting the second sensing current, and a semiconductor layer connected between the input terminal and the output terminal.

4. The sensor of claim 3, wherein the semiconductor layer of the first sensor transistor and the semiconductor layer of the second sensor transistor comprise the same material.

5. The sensor of claim 4, wherein the material of the semiconductor layers comprise amorphous silicon.

6. The sensor of claim 3, wherein the first capacitor has a first terminal coupled to the output terminal of the first sensor transistor and a second terminal supplied with a second voltage, and the second capacitor has a first terminal coupled to the output terminal of the second sensor transistor and a second terminal supplied with the second voltage.

7. The sensor of claim 6, further comprising:
   a first switching transistor outputting the first sensing voltage in response to a switching signal; and
   a second switching transistor outputting the second sensing voltage in response to the switching signal.

8. The sensor of claim 7, wherein the first switching transistor comprises a control terminal supplied with the switching signal, an input terminal supplied with the first sensing voltage, and an output terminal outputting the first sensing voltage, and
   wherein the second switching transistor comprises a control terminal supplied with the switching signal, an input terminal supplied with the second sensing voltage, and an output terminal outputting the second sensing voltage.

9. The sensor of claim 7, further comprising:
   a third capacitor storing an output voltage of the first switching transistor; and
   a fourth capacitor storing an output voltage of the second switching transistor.

10. The sensor of claim 9, wherein the third capacitor comprises a first terminal coupled with the output terminal of the first switching transistor and a second terminal supplied with the second voltage, and
    wherein the fourth capacitor comprises a first terminal coupled with the output terminal of the second switching transistor and a second terminal supplied with the second voltage.

11. The sensor of claim 6, further comprising:
    a first reset transistor initiating the first sensing voltage in response to a reset signal; and
    a second reset transistor initiating the second sensing voltage in response to the reset signal.

12. The sensor of claim 11, wherein the first reset transistor comprises a control terminal supplied with the reset signal, an input terminal supplied with the second voltage, and an output terminal outputting the second voltage, and the second reset transistor comprises a control terminal supplied with the reset signal, an input terminal supplied with the second voltage, and an output terminal outputting the second voltage.

13. A display device comprising:
a sensor generating a first sensing voltage based on an amount of external light and a second sensing voltage based on an amount of external heat, the external light and the external heat being generated from an exterior of the display device;
a sensing signal processor processing the first and the second sensing voltages and generating a control voltage based on the processed first and second sensing voltages;
a display panel including pixels; and
a controller controlling luminance of the pixels based on the control voltage,
wherein the sensor comprises:
  a first sensor transistor generating a first sensing current based on an amount of the external light;
  a first capacitor storing the first sensing voltage based on the first sensing current from the first sensor transistor;
  a second sensor transistor generating a second sensing current based on an amount of the external heat;
  a second capacitor storing the second sensing voltage based on the second sensing current from the second sensor transistor; and
  a light blocking member blocking the second sensor transistor from the external light and including an opening which penetrates through an extending surface of the light blocking member and exposes the first sensor transistor to the external light,
  wherein both the first sensor transistor and the second sensor transistor are disposed on a same side with respect to the light blocking member.

14. The display device of claim 13, wherein the sensor is disposed at a peripheral area of the display panel.

15. The display device of claim 13, wherein the first sensor transistor comprises a first semiconductor layer generating the first sensing current, the second sensor transistor comprises a second semiconductor layer generating the second sensing current, and the first and the second semiconductor layers comprise amorphous silicon.

16. The display device of claim 15, wherein the sensor further comprises:
a first switching transistor outputting the first sensing voltage in response to a switching signal; and
a second switching transistor outputting the second sensing voltage in response to the switching signal.

17. The display device of claim 16, wherein the sensor further comprises:
a third capacitor storing an output voltage of the first switching transistor; and
a fourth capacitor storing an output voltage of the second switching transistor.

18. The display device of claim 15, wherein the sensor further comprises:
a first reset transistor initiating the first sensing voltage in response to a reset signal; and
a second reset transistor initiating the second sensing voltage in response to the reset signal.

19. The display device of claim 13, wherein the display device is one of a liquid crystal display device, an organic light emitting diode display device, a plasma display panel device, and a combination including at least one of the foregoing.

20. The display device of claim 19, wherein the display device is a transflective liquid crystal display device.

21. A display device comprising:
a display panel comprising:
  pixels,
  a liquid crystal layer disposed between a first electrode panel and a second electrode panel facing the first electrode panel, and
  a sensor generating a first sensing voltage based on an amount of external light and a second sensing voltage based on an amount of external heat, the external light and the external heat being generated from an exterior of the display device;
a sensing signal processor processing the first and the second sensing voltages and generating a control voltage based on the processed first and second sensing voltages; and
a controller controlling luminance of the pixels based on the control voltage, wherein the sensor of the display panel comprises:
  a first sensor transistor generating a first sensing current based on an amount of the external light;
  a first capacitor storing the first sensing voltage based on the first sensing current from the first sensor transistor;
  a second sensor transistor generating a second sensing current based on an amount of the external heat;
  a second capacitor storing the second sensing voltage based on the second sensing current from the second sensor transistor; and
  a light blocking member blocking the second sensor transistor from the external light and including an opening which penetrates through an extending surface of the light blocking member and exposes the first sensor transistor to the external light.

* * * * *